US 8,827,715 B1

(12) United States Patent
Champagne

(10) Patent No.: US 8,827,715 B1
(45) Date of Patent: Sep. 9, 2014

(54) ARTIFICIAL HORSE LEG STAND

(71) Applicant: Wesley Jon Champagne, Altadena, CA (US)

(72) Inventor: Wesley Jon Champagne, Altadena, CA (US)

(*) Notice: Subject to any disclaimer, the term of this patent is extended or adjusted under 35 U.S.C. 154(b) by 0 days.

(21) Appl. No.: 14/157,225

(22) Filed: Jan. 16, 2014

Related U.S. Application Data

(63) Continuation of application No. PCT/US2013/036443, filed on Apr. 12, 2013.

(60) Provisional application No. 61/706,593, filed on Sep. 27, 2012.

(51) Int. Cl.
*A01L 11/00* (2006.01)

(52) U.S. Cl.
CPC .................................... *A01L 11/00* (2013.01)
USPC ....................................................... 434/225

(58) Field of Classification Search
CPC ................................ A01L 11/00; A01L 13/00
USPC .............................. 434/225, 219, 247; 168/44
See application file for complete search history.

(56) References Cited

U.S. PATENT DOCUMENTS

| 6,848,512 | B2 | 2/2005 | Keeler |
| 7,494,341 | B2 | 2/2009 | Champagne et al. |
| 2006/0113090 | A1 | 6/2006 | DeCola et al. |
| 2007/0119601 | A1 | 5/2007 | Leonard |
| 2011/0203811 | A1* | 8/2011 | Williams, Jr. ................... 168/44 |

FOREIGN PATENT DOCUMENTS

EP 1714552 3/2010

OTHER PUBLICATIONS

International Search Report and Written Opinion for International Application No. PCT/US2013/036443, dated Jul. 1, 2013.
International Search Report and the Written Opinion, dated Jul. 1, 2013, as cited in International Patent Application No. PCT/US2013/036443 (11pgs).

* cited by examiner

*Primary Examiner* — Sam Yao
*Assistant Examiner* — Jennifer L Fassett
(74) *Attorney, Agent, or Firm* — David A. Belasco; Belasco Jacobs & Townsley, LLP

(57) ABSTRACT

An artificial horse leg stand includes a planar base, outer and inner tubular members providing height adjustment with an angled bracket at an upper end of the inner member. The bracket has a mounting feature located adjacent the distal end for attachment of a rotating trunion and a lower shock mount at the proximate end. The trunion has cylindrical positioning features extending outwardly from first and second sides. An attachment fixture1 is located orthogonally to a horizontal axis of the trunion. The trunion has an upper shock mount spaced from the attachment fixture. The trunion is rotatably attached by the cylindrical positioning features to the mounting feature. Dual-acting gas shock absorbers are rotatably attached to the upper and lower shock mounts. A securing fixture is attached to the attachment fixture at the first end and has a mounting feature at the second end for attachment to an artificial horse leg.

10 Claims, 3 Drawing Sheets

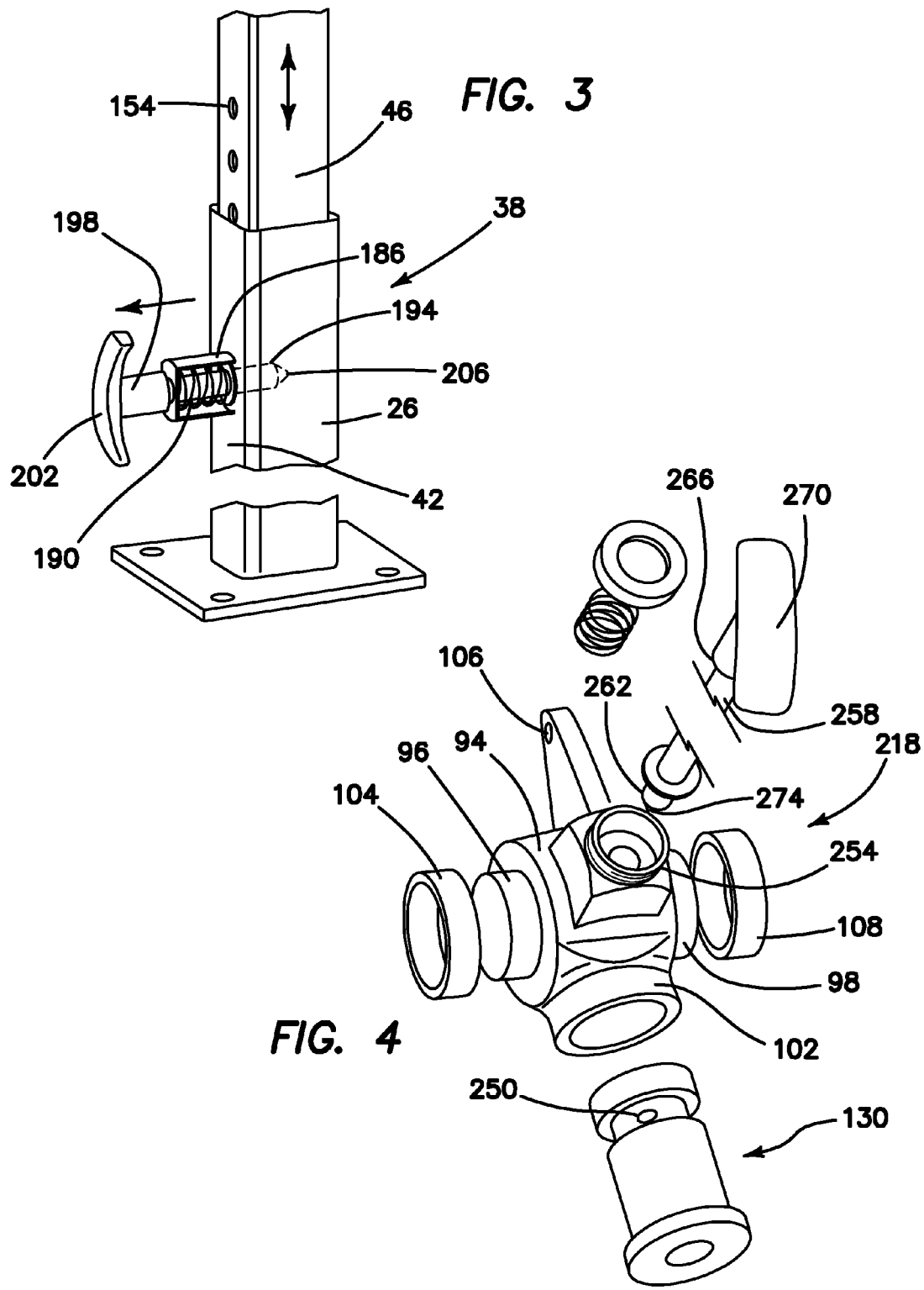

ARTIFICIAL HORSE LEG STAND

RELATED APPLICATIONS

The instant application is a continuation of U.S. PCT Application Ser. No. PCT/US13/36443 filed Apr. 12, 2013 and a continuation of U.S. Provisional Application Ser. No. 61/706,593 filed Sep. 27, 2012 and claims priority from both applications. An amended Application Data Sheet is enclosed herewith.

FIELD OF INVENTION

This invention relates to the field of training systems, and more specifically to an artificial leg stand for use with a training system for teaching farriers to make and attach horseshoes to the hooves of horses.

BACKGROUND OF THE INVENTION

The horse's hoof is composed of five major regions: the wall, the sole, the frog, the periople and the white line. The hoof grows as a result of cell division in the outer horn-producing cell layer of the sensitive structures of the hoof, namely the perioplic ring, the coronary band and the sensitive laminae. This process may be affected by many factors such as diet, stresses, injuries and diseases. In such cases, a distorted hoof is often produced. The hoof wall is of primary concern. It bears most of the horse's weight, is the most subject to wear and trauma and is the point of attachment of horseshoes, an invention designed to protect the hoof wall from rough terrain. Horseshoes have been employed for hundreds of years to help alleviate trauma to the horse's hooves, improve traction and to help heal damaged hooves.

The design and application of horse shoes requires the hands-on, personal attention of the farrier, previously known as a blacksmith. The farrier's job entails studying the hooves of a horse to be shod and selecting, adapting and even manufacturing horse shoes suitable to the individual horse. While there is substantial similarity in horse hooves, there are also many variations due to the factors mentioned above and simply due to genetic factors. After selecting and/or manufacturing suitable horse shoes, the farrier must safely install the horse shoes on the hooves of the horse. As horses tend to weigh 1000 lbs. or more and may have difficult personalities, the attachment of a horseshoe to the hoof of a horse without injury to the horse or the farrier is a task requiring considerable skill. Further complicating the work is the fact that the hoof must usually be trimmed to mate properly with the horseshoe and the shoe is typically attached with nails. If the nails are driven too deeply into the hoof, delicate capillaries may be injured and bleeding, discomfort and even infection may result.

Until recently, farriers were often trained using legs cut from dead horses. Recent legislation has severely limited such practices. The present invention addresses all of these problems in the training of farriers. The Applicant has developed a farrier training system that includes artificial horse legs and hooves upon which the apprentice farrier may practice to perfect his skill. The instant invention is a stand for this artificial horse leg that simulates the positioning and action of a live horse to make such practice more efficient and realistic.

U.S. Patent Application No. 2011/0203811, published for Williams et al., discloses support stand for supporting the leg and hoof of a horse includes a base member adapted for seating on a horizontal support surface, and a hoof receptacle including bottom, rear end, and side walls that cooperate to define an open topped hoof-receiving chamber that is open at its forward end. A vertical adjustment device serves to adjust the vertical position of the hoof receptacle relative to the base. The hoof receptacle is connected with the vertical adjustment device for pivotal displacement about a horizontal pivot axis parallel with the receptacle rear wall, and an angle adjustment device serves to adjust the angular orientation of the hoof receptacle relative to the vertical adjustment rod. Accordingly, the horse leg is held in a flexed, pre-set position by adjustment of the leg and hoof support.

U.S. Pat. No. 7,510,021, issued to Leonard is directed to a portable adjustable hoof stand in which the height of the hoof rest relative to the ground is adjustable during setup and in use. Hoof rest height adjustment is provided by a height adjustment means located between the hoof rest and the tapered base of the hoof stand. In one embodiment of the adjustable hoof support stand, the height adjustment member comprises a post and a tubular receiving member, the receiving member sized to slidably and telescopically receive the post. The post is provided with a series of holes there-through along its length. As the post's position is adjusted inside and relative to the tubular receiving member, at various positions holes in the post align with holes in the tubular receiving member and a locking pin may be inserted through the aligned holes to fix the position of the post in the receiving member. The holes are positioned frequently enough in close enough spacing to provide a multitude of selectable height adjustment options.

U.S. patent application Ser. No. 2006/0113090, published for DeCola et al. illustrates a hoof stand which includes a flattened tripod base and a generally vertical support which may be quickly changed from pillar to cradle, allowing a horse's hoof to be held as desired in the normal or inverted positions, as an aid in horseshoeing and hoof maintenance. Continuous height adjustment is provided by telescoping receiving members, which may be quickly clamped together and quickly released. Collapsibility is provided by removing a tubular segment or by retractable legs. A pad on the cradle and texture on the pillar provide increased functionality and safety.

U.S. Pat. No. 6,640,905, issued to Keeler discloses an adjustable horse owner's and farrier's stand includes a plastic base having a large generally flat base and an upright portion upending from the base, and a hoof platform adjustably locked in the base. The hoof platform height may be adjusted continuously rather than incrementally for precise and accurate positioning of a hoof. One hoof platform includes a diverging U-shaped cradle, with a firm but cushioning, shock-absorbing material on its top side for holding the hoof and absorbing the concussion of nailing and hoof maintenance. Preferably, the firm but cushioning material is a flexible strap slung across the cradle to form a hoof-receiving sling spaced above the surface of the cradle. Interchangeable hoof platforms may be provided, such as an alternative platform with a flat surface to receive the bottom of a hoof. The plastic base, and the continuous adjustability of the height of the hoof platform provide a quiet, substantially non-metallic, and non-intimidating stand that does not frighten most horses. It is an objective of the present invention to provide an apparatus that simulates the postures necessary to properly hold the horse's leg for shoeing. It is a further objective to provide such a system that simulates the action of the tendons and muscles of a live horse as the horse's hoof is shod. It is a still further objective of the invention to provide such an apparatus that may be easily and conveniently mounted to a variety of work surfaces. It is yet a further objective to provide an apparatus that couples conveniently to the artificial horse legs of the Applicant's farrier training system. Finally, it is an objective of the present invention to provide an apparatus that is durable and economical to produce.

U.S. Pat. No. 7,510,021, issued to Tyree discloses a hoof care stand for receiving the leg of an animal, preferably the front leg or rear leg of a horse, for care thereof. The hoof care stand has a two dimensionally curved leg receiving portion with padding on an inner surface thereof. The leg receiving portion is flexibly attached relative to a base using a flexible attaching member such as a spring. An attachment rod provides for vertical adjustment of the leg receiving portion relative to the base and is selectively held in place therein by an adjusting screw.

U.S. Pat. No. 5,979,562, issued to Hammonds discloses a hoof care stand for livestock having a triangular base formed with a semi-open juncture of two U-shaped rods which have been welded together at one side, and are spaced apart at the opposite side. As the legs extend upwardly from the foot elements, they cooperate to form a cradle-like opening into which the animal's hoof may be placed. The cradle is a simplistic structure which consists of a mouth-like elliptical opening with a single limiting element in the bottom of the cradle padded to ensure the animal's comfort. No openings exist in the stand, other than that offered by the cradle, which could trap the animal's hoof. Accordingly, the present invention provides an improved farrier's stand which is relatively lightweight and stable, offering additional feet for improved stability. The stand also provides a comfortable, non-restraining resting position for the animal during use and presents no traps which may be hazardous to the animal or farrier. Further, the stand has few parts which wear out during use, the exception being the padding of the cradle element.

While some of the objectives of the present invention are disclosed in the prior art, none of the inventions found include all of the requirements identified.

SUMMARY OF THE INVENTION

The present invention addresses all of the deficiencies of prior art farrier training system inventions and satisfies all of the objectives described above.

(1) An artificial horse leg stand system providing the desired features may be constructed from the following components. A planar base is provided. The base has at least one fitting for securing the base to a surface. An outer tubular member is provided. The outer member has an interior cavity, is orthogonally attached to the base and extends upwardly from the base for a first predetermined distance. The outer member has a height adjusting mechanism. The mechanism is orthogonally attached to an exterior surface of the outer member and at least partially extends into the interior cavity. An inner tubular member is provided. The inner member has a first end, a second end and is sized and shaped to fit slidably within the interior cavity. An angle bracket is provided. The bracket has a proximal end, a distal end, is attached at the proximal end to the first end of the inner member and has at least one mounting feature located adjacent the distal end.

At least one lower shock mount is provided. The shock mount is located adjacent the proximal end of the angle bracket. The at least one shock mount has a first pivotal mounting point. The first point is spaced outwardly from a centerline of the angle bracket.

A rotating trunion is provided. The trunion has a first side, an opposite second side and first and second cylindrical positioning features extending outwardly from each of the first and second sides. An attachment fixture is located orthogonally to a horizontal axis of the trunion. The trunion has a second pivotal mounting point. The second point is located orthogonally to the horizontal axis and spaced from the attachment fixture. The trunion is rotatably attached by the first and second cylindrical positioning features to the at least one mounting feature adjacent the distal end of the angle bracket.

At least one dual-acting gas shock absorber is provided. The shock absorber has first and second ends and has mounting apertures located adjacent each of the first and second ends. The mounting apertures are rotatably attached to the first and second pivotal mounting points. A securing fixture is provided. The securing fixture has a first end, a second end, is attached at the first end to the attachment fixture and has a mounting feature at the second end for attachment to an artificial horse leg.

(2) In a variant of the invention, the outer tubular member and the inner tubular member are circular in cross-section.

(3) In another variant, the inner tubular member further includes either of a series of apertures or a series of detents, located vertically along the member, thereby providing a locking height adjustment displacing the inner member upwardly from the outer member.

(4) In still another variant, the height adjusting mechanism includes a threaded barrel orthogonally attached to the exterior surface of the outer member and a mating threaded rod located within the barrel. The rod has a proximate end, a distal end, a fitting for turning the threaded rod located at the distal end. The rod has an engaging point located at the proximate end for securing a height adjustment between the inner tubular member and the outer tubular member.

(5) In yet another variant, the height adjusting mechanism includes a barrel orthogonally attached to the exterior surface of the outer member and a spring-loaded rod located within the barrel. The rod has a proximate end, a distal end, a fitting for withdrawing the spring-loaded rod located at the distal end. The rod has an engaging point located at the proximate end for securing a height adjustment between the inner tubular member and the outer tubular member.

(6) In a further variant, the cylindrical positioning features are mounted to the angle bracket with first and second bearings with first and second securing caps. The securing caps are attached to the angle bracket at the at least one mounting feature adjacent the distal end of the angle bracket.

(7) In still a further variant, the rotating trunion further includes a rotation locking mechanism. The mechanism is located orthogonally to the horizontal axis and permits locking of the securing fixture in at least one position to control a rotational position of the artificial horse leg.

(8) In yet a further variant, the rotation locking mechanism further includes a threaded nut. The nut is located orthogonally to the horizontal axis. A mating threaded rod is located within the nut. The rod has a proximate end, a distal end, a fitting for turning the threaded rod located at the distal end. The rod has an engaging point located at the proximate end for securing a rotational locking between the attachment fixture and the securing fixture.

(9) In another variant of the invention, the rotation locking mechanism further includes a series of either of apertures or detents. The apertures or detents are located radially on the securing fixture. A barrel is provided. The barrel is located orthogonally to the securing fixture. A spring-loaded rod is located within the barrel. The rod has a proximate end, a distal end and a fitting for withdrawing the spring-loaded rod located at the distal end. The rod has an engaging point located at the proximate end for securing a rotational locking between the between said attachment fixture and said securing fixture.

In a final variant, the securing fixture is removably attached to the attachment fixture.

An appreciation of the other aims and objectives of the present invention and an understanding of it may be achieved by referring to the accompanying drawings and the detailed description of a preferred embodiment

DESCRIPTION OF THE DRAWINGS

FIG. 3 is a perspective an alternative view of the height adjustment mechanism;

FIG. 4 is an exploded perspective view of the rotation locking mechanism.

DETAILED DESCRIPTION OF THE PREFERRED EMBODIMENT (1) FIGS. 1-4 illustrate an artificial horse leg stand system 10 providing the desired features that may be constructed from the following components. As illustrated in FIGS. 1-3, planar base 14 is provided. The base 14 has at least one fitting 18 for securing the base 14 to a surface 22. An outer tubular member 26 is provided. The outer member 26 has an interior cavity 30, is orthogonally attached to the base 14 and extends upwardly from the base 14 for a first predetermined distance 34. The outer member 26 has a height adjusting mechanism 38. The mechanism 38 is orthogonally attached to an exterior surface 42 of the outer member 26 and at least partially extends into the interior cavity 30. An inner tubular member 46 is provided. The inner member 46 has a first end 50, a second end 54 and is sized and shaped to fit slidably within the interior cavity 30. An angle bracket 58 is provided. The bracket 58 has a proximal end 62, a distal end 66, is attached at the proximal end 62 to the first end 50 of the inner member 46 and has at least one mounting feature 70 located adjacent the distal end 66.

At least one lower shock mount 74 is provided. The shock mount 74 is located adjacent the proximal end 62 of the angle bracket 58. The at least one shock mount 74 has a first pivotal mounting point 78. The first point 78 is spaced outwardly from a centerline 82 of the angle bracket 58. As illustrated in FIGS. 1, 2 and 4, rotating trunion 94 is provided. The trunion 94 has a first side 90, an opposite second side 92 and first 96 and second 98 cylindrical positioning features extending outwardly from each of the first 90 and second 92 sides. An attachment fixture 102 is located orthogonally to a horizontal axis 100 of the trunion 94. The trunion 94 has a second pivotal mounting point 106. The second point 106 is located orthogonally to the horizontal axis 100 and spaced from the attachment fixture 102. The trunion 94 is rotatably attached by the first 96 and second 98 cylindrical positioning features to the at least one mounting feature 70 adjacent the distal end 66 of the angle bracket 58.

Figure 1:
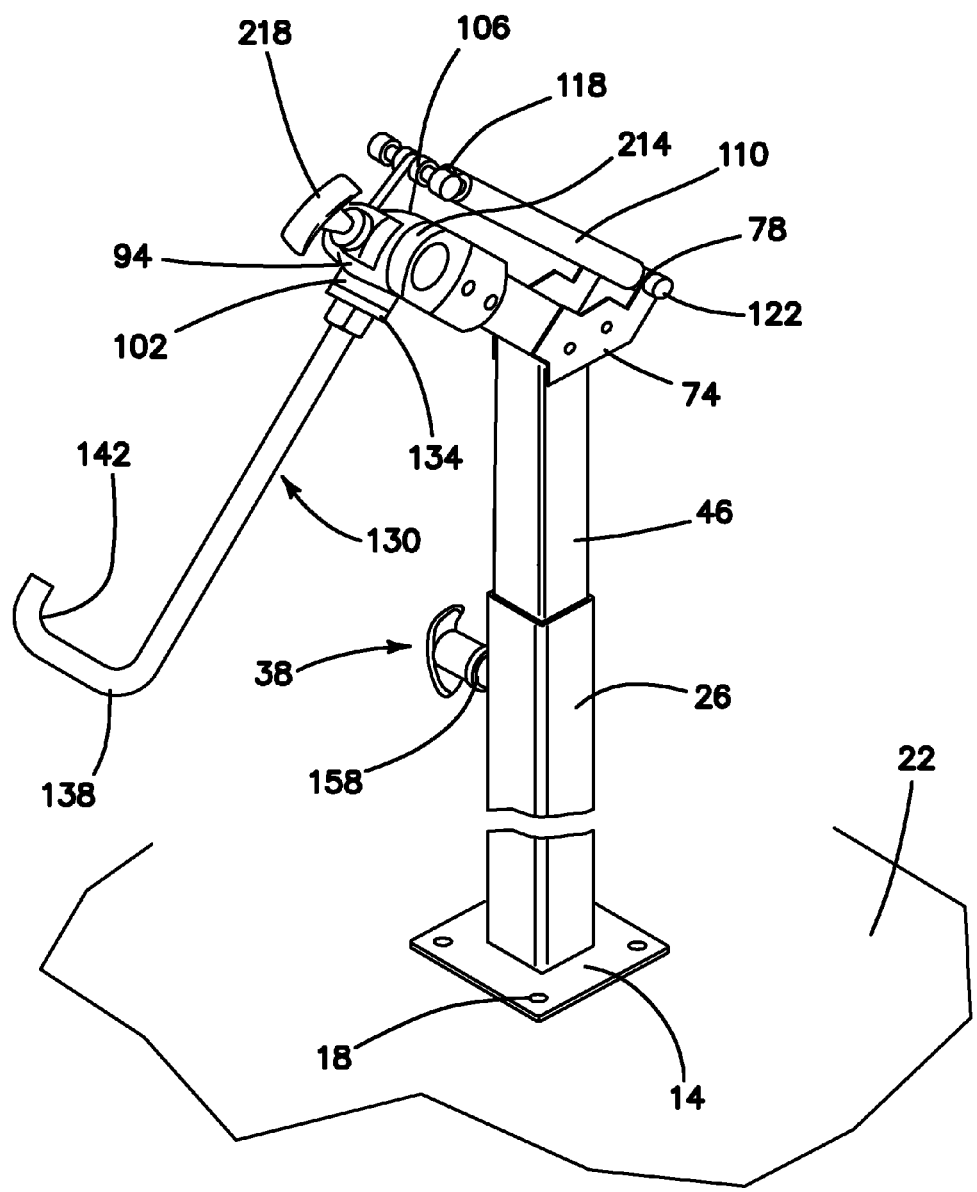
FIG. 1 is a perspective view of the FIG. 1 embodiment.

At least one dual-acting gas shock absorber 110 is provided. The shock absorber 110 has first 114 and second 118 ends and has mounting apertures 122, 126 located adjacent each of the first 114 and second 118 ends. The mounting apertures 122, 126 are rotatably attached to the first 78 and second 106 pivotal mounting points. A securing fixture 130 is provided. The securing fixture 130 has a first end 134, a second end 138, is attached at the first end 134 to the attachment fixture 102 and has a mounting feature 142 at the second end 138 for attachment to an artificial horse leg (not shown).

(2) In a variant of the invention, the outer tubular member 26 and the inner tubular member 46 are circular in cross-section (not shown).

Figure 2:
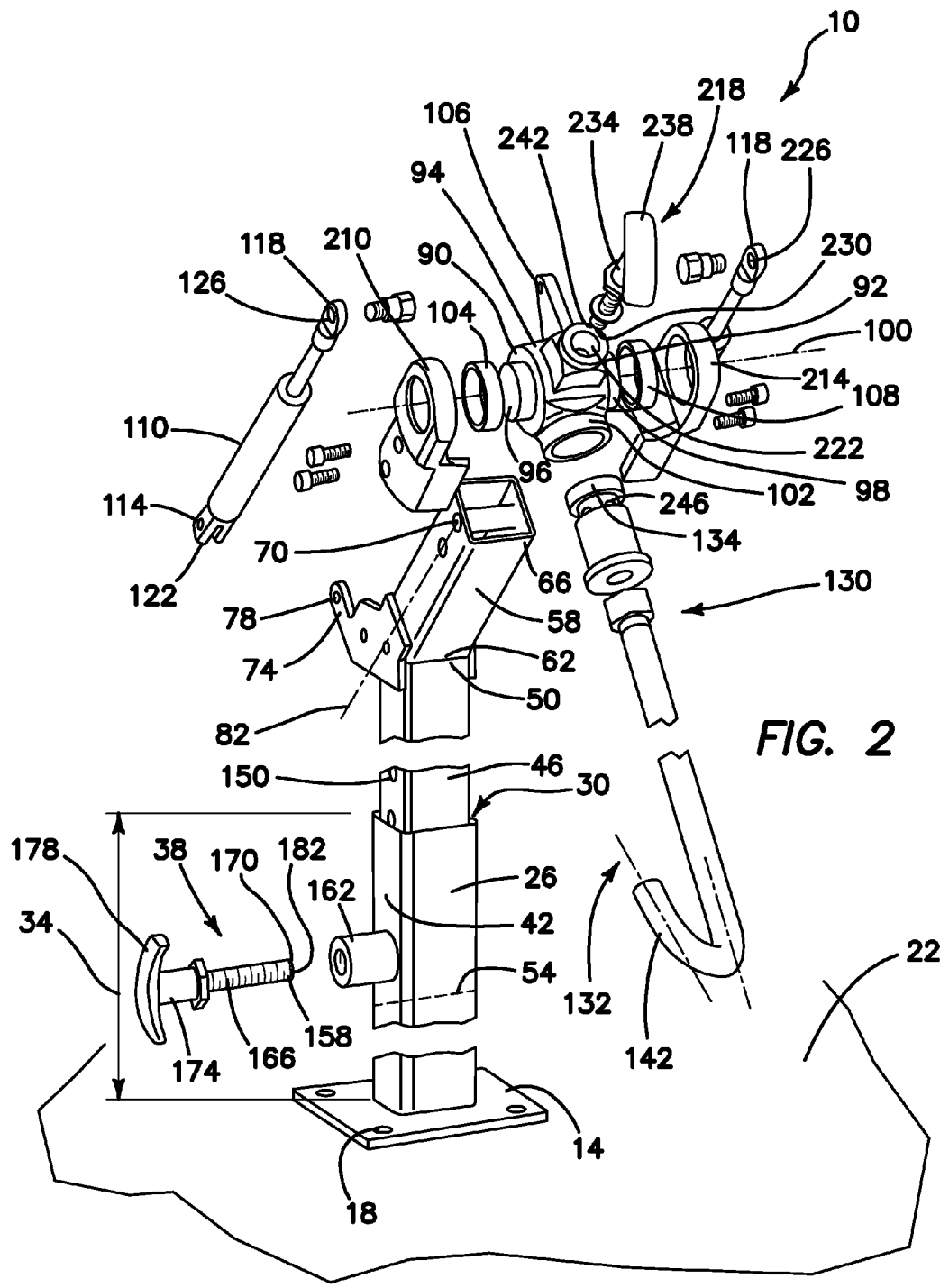
FIG. 2 is an exploded perspective view of the FIG. 1 embodiment.

(3) In another variant, as illustrated in FIGS. 2 and 3, the inner tubular member 46 further includes either of a series of apertures 150 or a series of detents 154, located vertically along the member 46, thereby providing a locking height adjustment 158 displacing the inner member 46 upwardly from the outer member 26.

(4) In still another variant, as illustrated in FIG. 2, the height adjusting mechanism 38 includes a threaded barrel 162 orthogonally attached to the exterior surface 42 of the outer member 26 and a mating threaded rod 166 located within the barrel 162. The rod 166 has a proximate end 170, a distal end 174, a fitting 178 for turning the threaded rod 166 located at the distal end 174. The rod 166 has an engaging point 182 located at the proximate end 170 for securing a height adjustment between the inner tubular member 46 and the outer tubular member 26.

(5) In yet another variant, as illustrated in FIG. 3, the height adjusting mechanism 38 includes a barrel 186 orthogonally attached to the exterior surface 42 of the outer member 26 and a spring-loaded rod 190 located within the barrel 186. The rod 190 has a proximate end 194, a distal end 198, a fitting 202 for withdrawing the spring-loaded rod 190 located at the distal end 198. The rod 190 has an engaging point 206 located at the proximate end 194 for securing a height adjustment between the inner tubular member 46 and the outer tubular member 26.

(6) In a further variant, as illustrated in FIGS. 2 and 4, the cylindrical positioning features 90, 92 are mounted to the angle bracket 58 with first 104 and second 108 bearings with first 210 and second 214 securing caps. The securing caps 210, 214 are attached to the angle bracket 58 at the at least one mounting feature 70 adjacent the distal end 66 of the angle bracket 58.

(7) In still a further variant, the rotating trunion 94 further includes a rotation locking mechanism 218. The mechanism 218 is located orthogonally to the horizontal axis 100 and permits locking of the securing fixture 130 in at least one position 132 to control a rotational position of the artificial horse leg (not shown).

(8) In yet a further variant, as illustrated in FIG. 2, the rotation locking mechanism 218 further includes a threaded nut 222. The nut 222 is located orthogonally to the horizontal axis 100. A mating threaded rod 226 is located within the nut 222. The rod 226 has a proximate end 230, a distal end 234, a fitting 238 for turning the threaded rod 226 located at the distal end 234. The rod 226 has an engaging point 242 located at the proximate end 230 for securing a rotational locking between the attachment fixture 102 and the securing fixture 130.

(9) In another variant of the invention, as illustrated in FIG. 4, the rotation locking mechanism 218 further includes a series of either of apertures 246 or detents 250. The apertures 246 or detents 250 are located radially on the securing fixture 130. A barrel 254 is provided. The barrel 254 is located orthogonally to the securing fixture 130. A spring-loaded rod 258 is located within the barrel 254. The rod 258 has a proximate end 262, a distal end 266 and a fitting 270 for withdrawing the spring-loaded rod 258 located at the distal end 266. The rod 258 has an engaging point 274 located at the proximate end 262 for securing a rotational locking between the between said attachment fixture 102 and said securing fixture 130.

(10) In a final variant, the securing fixture 130 is removably attached to the attachment fixture 102.

The farrier training system 10 has been described with reference to particular embodiments. Other modifications and enhancements can be made without departing from the spirit and scope of the claims that follow.

The invention claimed is:

1. An artificial horse leg stand, comprising:
   a planar base, said base having at least one fitting for securing said base to a surface;
   an outer tubular member, said outer member having an interior cavity, being orthogonally attached to said base and extending upwardly from said base for a first predetermined distance;
   said outer member having a height adjusting mechanism, said mechanism orthogonally attached to an exterior surface of said outer member and at least partially extending into said interior cavity;
   an inner tubular member, said inner member having a first end, a second end and being sized and shaped to fit slidably within said interior cavity;
   an angle bracket, said bracket having a proximal end, a distal end, being attached at said proximal end to said first end of said inner member and having at least one mounting feature disposed adjacent said distal end;
   at least one lower shock mount, said shock mount disposed adjacent said proximal end of said angle bracket;
   said at least one shock mount having a first pivotal mounting point, said first point spaced outwardly from a centerline of said angle bracket;
   a rotating trunion, said trunion having a first side, an opposite second side and first and second cylindrical positioning features extending outwardly from each of said first and second sides;
   an attachment fixture is disposed orthogonally to a horizontal axis of said trunion, said trunion having a second pivotal mounting point, said second point being located orthogonally to said horizontal axis and spaced from said attachment fixture;
   said trunion being rotatably attached by said first and second cylindrical positioning features to said at least one mounting feature adjacent said distal end of the angle bracket;
   at least one dual-acting gas shock absorber, said shock absorber having first and second ends and having mounting apertures disposed adjacent each of said first and second ends, said mounting apertures rotatably attached to said first and second pivotal mounting points; and
   a securing fixture, said securing fixture having a first end, a second end, being attached at said first end to said attachment fixture and having a mounting feature at said second end for attachment to an artificial horse leg.

2. The artificial horse leg stand, as described in claim 1, wherein said outer tubular member and said inner tubular member are circular in cross-section.

3. The artificial horse leg stand, as described in claim 1, wherein said inner tubular member further comprises either of a series of apertures and a series of detents, disposed vertically along said member, thereby providing a locking height adjustment displacing said inner member upwardly from said outer member.

4. The artificial horse leg stand, as described in claim 1, wherein said height adjusting mechanism comprises a threaded barrel orthogonally attached to said exterior surface of said outer member, a mating threaded rod disposed within said barrel, said rod having a proximate end, a distal end, a fitting for turning said threaded rod disposed at said distal end and an engaging point disposed at said proximate end for securing a height adjustment between said inner tubular member and said outer tubular member.

5. The artificial horse leg stand, as described in claim 3, wherein said height adjusting mechanism comprises a barrel orthogonally attached to said exterior surface of said outer member, a spring-loaded rod disposed within said barrel, said rod having a proximate end, a distal end, a fitting for withdrawing said spring-loaded rod disposed at said distal end and an engaging point disposed at said proximate end for securing a height adjustment between said inner tubular member and said outer tubular member.

6. The artificial horse leg stand, as described in claim 1, wherein said cylindrical positioning features are mounted to said angle bracket with first and second bearings with first and second securing caps, said securing caps being attached to said angle bracket at said at least one mounting feature adjacent said distal end of said angle bracket.

7. The artificial horse leg stand, as described in claim 1, wherein said rotating trunion further includes a rotation locking mechanism, said mechanism being located orthogonally to said horizontal axis and permitting locking of said securing fixture in at least one position to control a rotational position of the artificial horse leg.

8. The artificial horse leg stand, as described in claim 7, wherein said rotation locking mechanism further comprises:
   a threaded nut, said nut being disposed orthogonally to said horizontal axis;
   a mating threaded rod disposed within said nut, said rod having a proximate end, a distal end, a fitting for turning said threaded rod disposed at said distal end and an engaging point disposed at said proximate end for securing a rotational locking between said attachment fixture and said securing fixture.

9. The artificial horse leg stand, as described in claim 7, wherein said rotation locking mechanism further comprises:
   a series of either of apertures and detents, said apertures and detents disposed radially on the securing fixture;
   a barrel, said barrel being disposed orthogonally to said securing fixture;
   a spring-loaded rod disposed within said barrel, said rod having a proximate end, a distal end, a fitting for withdrawing said spring-loaded rod disposed at said distal end and an engaging point disposed at said proximate end for securing a rotational locking between said attachment fixture and said securing fixture.

10. The artificial horse leg stand, as described in claim 1, wherein said securing fixture is removably attached to said attachment fixture.

* * * * *